Nov. 29, 1932.   W. M. BAUMHECKEL   1,889,397
WATER PUMP PACKING
Filed April 25, 1930   2 Sheets-Sheet 1
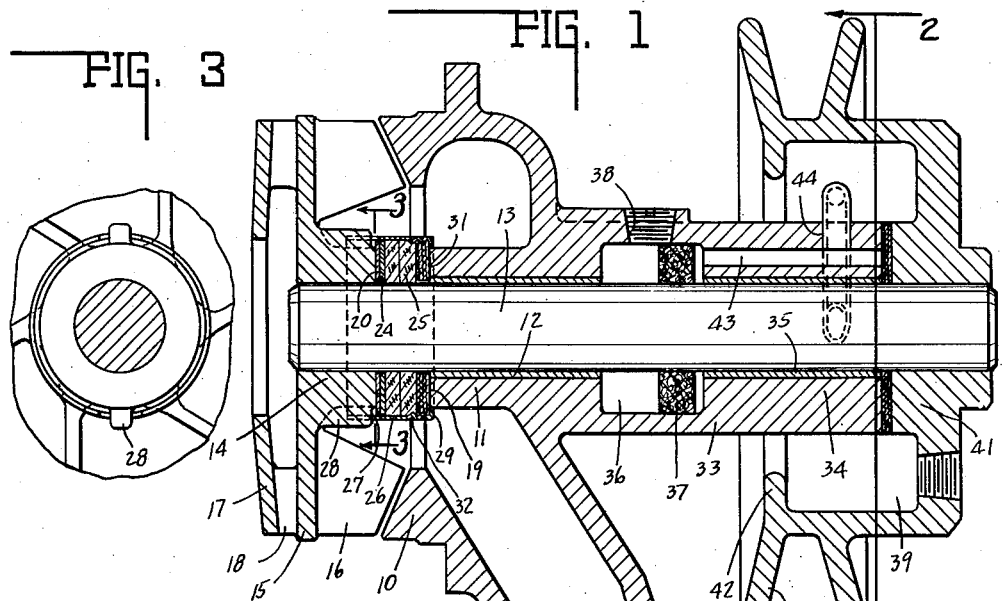
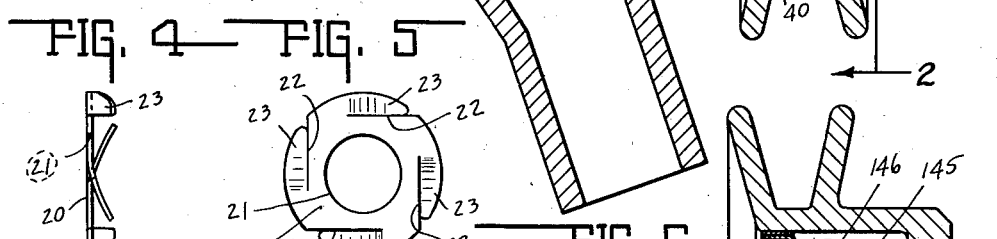
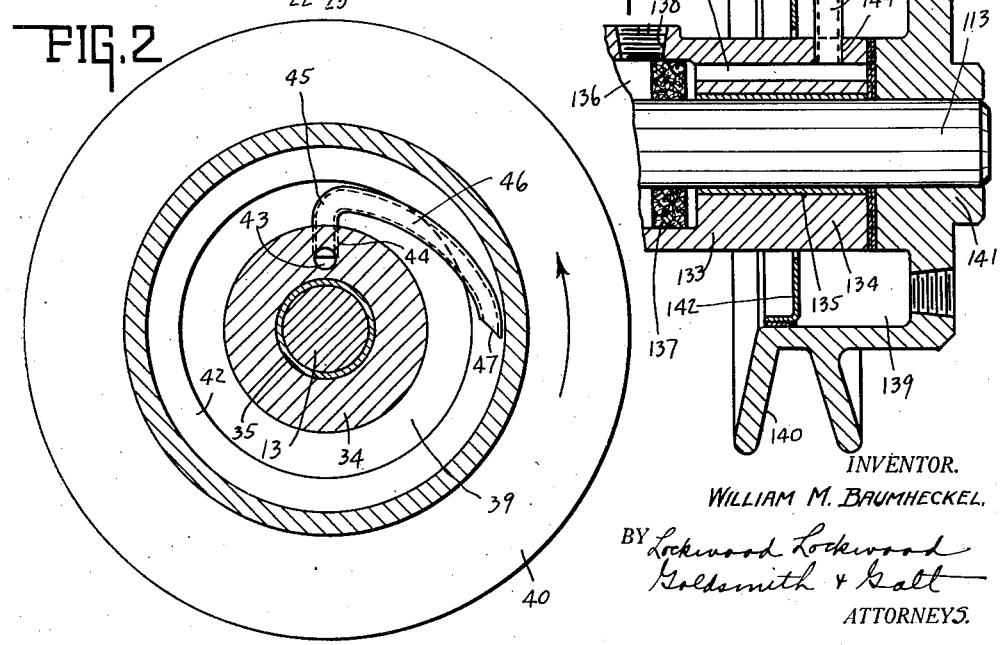
INVENTOR.
WILLIAM M. BAUMHECKEL.
BY Lockwood Lockwood
Goldsmith & Galt
ATTORNEYS.

Nov. 29, 1932.  W. M. BAUMHECKEL  1,889,397
WATER PUMP PACKING
Filed April 25, 1930  2 Sheets-Sheet 2
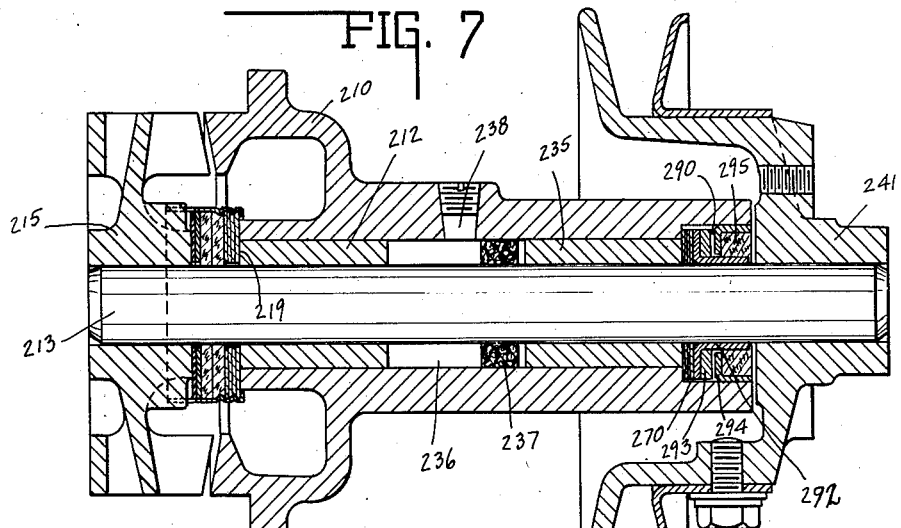
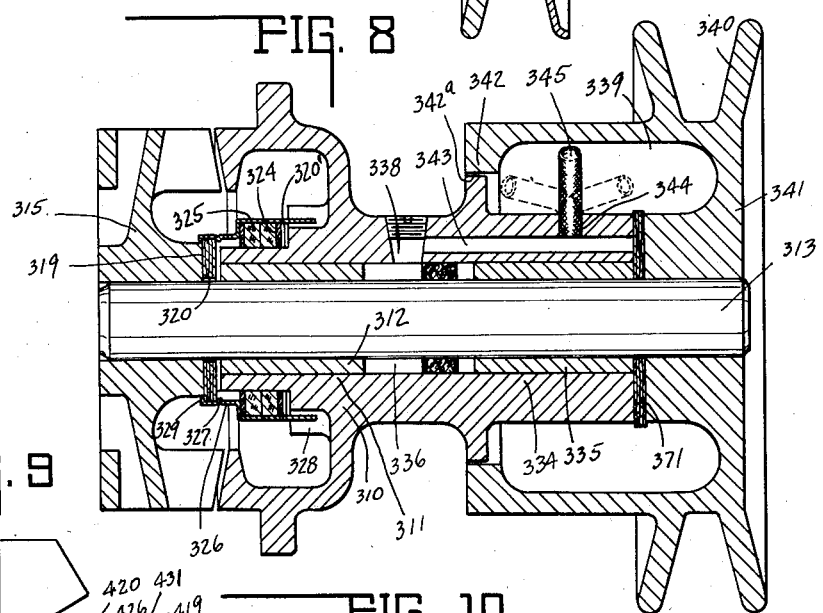
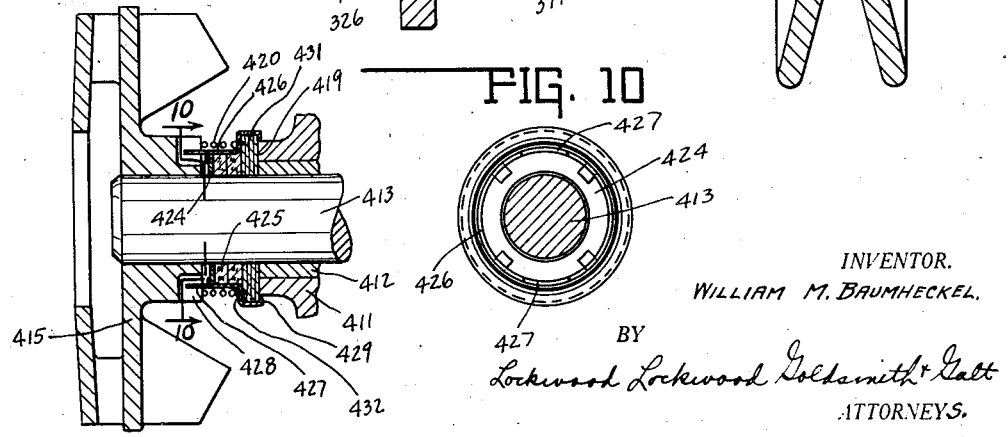
INVENTOR.
WILLIAM M. BAUMHECKEL.
BY
Lockwood Lockwood Goldsmith & Galt
ATTORNEYS.

Patented Nov. 29, 1932

1,889,397

UNITED STATES PATENT OFFICE

WILLIAM M. BAUMHECKEL, OF CONNERSVILLE, INDIANA, ASSIGNOR, BY DIRECT AND MESNE ASSIGNMENTS, TO B B B CORPORATION, OF DETROIT, MICHIGAN

WATER PUMP PACKING

Application filed April 25, 1930. Serial No. 447,370.

This invention relates to a water pump construction suitable for automobiles and the like, and the sealing construction incorporated therein.

The chief object of this invention, as well as the invention disclosed in the before mentioned application, is to provide a construction suitable for water pump purposes for automobiles which, under present day conditions, have a speed of 2,000 to 4,000 R. P. M. or more with a vehicle speed of over 60 miles per hour. With higher vehicle speeds the water pump speed may be correspondingly increased. This relative high speed requires that a water pump maintain a relatively effective seal between the rotor shaft and the pump housing and over a relatively long period of time and with a minimum of adjustment. This high speed also requires that the shaft be lubricated and kept lubricated. Leakage of the liquid to be pumped past the seal and through the bearings very shortly washes out or removes the lubricant with the result that the water pump quickly becomes noisy and inefficient, since without lubrication the wear becomes progressive in character.

The present invention provides a construction which prevents all of the objectionable practices heretofore encountered by effectually sealing a liquid to be pumped from the lubricant and maintaining said seal substantially independent of the life of the pump and to do so the seal is of the self compensating type.

One feature of the invention in addition to the general association of the parts which is common to this and the co-pending application, consists in the particular type of seal construction which has the characteristic of the sealing member being positively driven through means other than the axial seal for the shaft.

Another feature of the invention consists in the construction of the rotor such that a compensating thrust or neutralizing thrust operation is obtained therein.

The nature of the invention will be understood from the accompanying drawings and the following description and claims:—

Fig. 1 is a longitudinal central sectional view of one form of the invention illustrated as an automobile water pump.

Fig. 2 is a transverse sectional view of the power pulley end of the construction and is taken on line 2—2 of Fig. 1 in the direction of the arrows.

Fig. 3 is a transverse sectional view taken on line 3—3 of Fig. 1 and in the direction of the arrows.

Fig. 4 is a side elevational view of one form of annular yielding or spring construction.

Fig. 5 is a front elevation thereof.

Fig. 6 is a longitudinal central sectional view of a modified form of power pulley construction embodied in the invention.

Fig. 7 is a view similar to Fig. 1 and of a modified form of the invention.

Fig. 8 is a longitudinal sectional view through a form of the invention illustrating two modified departures.

Fig. 9 is a longitudinal sectional view through a modified form of driving seal.

Fig. 10 is a transverse sectional view taken on line 10—10 of Fig. 9 and in the direction of the arrows.

In the drawings 10 indicates a water pump housing into which projects a bearing 11 that receives a bushing 12, in turn rotatably supporting a shaft 13. The projecting end of shaft 13 is press fitted and thereby secured to a hub 14 of a rotor of a water pump. Herein the hub supports a plate 15 which carries the rotor vanes or blades 16. In spaced relation to plate 16 is another plate 17 secured thereto by the vane connecting portions 18.

The automatic sealing construction interposed between the face 19 of the shaft bearing and the rotor hub includes an outwardly directed substantially annular yielding construction or spring means, the same being shown clearly in Figs. 4 and 5 and including a body portion 20, apertured at 21 and notched as at 22 to form the spring wings 23. This annular yielding spring construction is loosely rotatable on the shaft, if desired. Concentric with said shaft is a steel washer 24 and encircling said shaft and having a frictional sealing connection therewith to prevent axial leakage, is a soft gasket construction 25, which herein is shown as comprised of a plurality of cork washers. Annularly encircling the same and frictionally engaged thereby, is a cylindrical body portion shell or housing means 26 which is notched as at 27 to receive the tongue portions 28 formed upon the rotor hub. Thus a tongue and groove, axially separable, interlocking and driving connection is provided between the rotor and the cylindrical portion 27. The opposite end of the cylindrical portion 27 includes an inwardly directed flange 29 which has an inner diameter preferably greater than the diameter of the projecting bearing portion 11. Interposed between the soft gasket 25 and the flange 29 is an annular, phenol condensation composition, sealing member 31 which may be of the general character, one form of which is commercially known as bakelite or the like, if desired or some other type of similarly acting material may be used so long as the same forms—as by lapping—and maintains a fluid tight joint with the surface 19 as the face of the bakelite washer 31 engages face 19 of the projecting housing bearing 11 and bears against the same due to the yielding backing obtained through the spring washer 20. Since the washer 31 is not metallic there is no clicking sound when contacted. The rotation of the annular sealing washer is obtained by the positive driving thereof through the cylindrical cup 26 and as indicated at 32, the cup may be indented to anchor the composition washer to the cup to the extent that rearward displacement thereof is prevented, while forward movement toward the bearing face 19 is not prevented. Through this construction none of the driving effort of the bearing washer 31 is obtained through the sealing soft gasket construction 25 so that the soft gasket construction has no other function than that of sealing and it will maintain itself for that purpose for the life of the pump. A soft gasket construction has the advantage over a hard gasket in that it will let the face washer flex at right angles to the shaft and will slide endwise with very little pressure and low face pressures are highly desirable.

While the Figs. 1 and 3 illustrate the hub as including the driving lug portion 28 and the cup as including the slotted portion 26, it is to be understood that the reverse thereof may be provided or any other equivalent driving connection may be provided. Similarly any other equivalent yielding construction may be provided in place of the disc like spring construction illustrated herein, although this construction appears to be the simplest and commercially the cheapest to manufacture.

Herein the pump housing is shown extended laterally as at 33 and terminates in a bearing 34, receiving a bushing 35 which rotatably supports the shaft 13. The body portion 33 in this form of the invention, is chambered as at 36 intermediate the two shaft bearing portions. Coaxial with said shaft and frictionally carried thereby and mounted within the chamber 36 is a felt oil retaining washer 37. The chamber 36 may be filled through the opening 38. The oil picked up by the washer is supplied to the shaft and feeds longitudinally along the same. Since the water in the pump is prevented from passing along the shaft through the bearing 11, this bearing will be lubricated at all times, at least so long as there is lubrication in the chamber 36 or in the oil felt distributor 37.

The oil discharged along the shaft and through the bearing 34 at the end of the bearing, tends to pass radially downward and when it does so, it discharges into a well or annular chamber 39 formed as a part of the power pulley 40, the hub 41 of which is press fitted upon the extended end of the shaft 13. The power pulley has an inwardly directed flange 42 which forms chamber 39. The oil which normally escapes from the bearing 34, flows around the annular outer wall of the pulley chamber and is retained in that vicinity by centrifugal action until such time as the pulley stops. The amount of lubrication that escapes and is within the pulley chamber is not sufficient to escape from without the flange 42 upon stopping of the pulley.

The body portion is longitudinally apertured as at 43, one end of which communicates with the chamber 36. The housing is laterally apertured as at 44 and mounted therein is a tube 45 which has a long spiral like extension 46 which terminates in an open mouth 47 lying adjacent the outer peripheral wall of the pulley chamber and within the projected diameter of the flange 42. See Fig. 2. Rotation of the pulley wheel will cause the cylindrical wall to pass by the open end of the mouth 47 and surplus lubrication collected therein will be automatically discharged into the mouth of the cup thereby and pass along the tube through the communicating passages 44 and 43 and thus return to the lubricant chamber 36. If the pulley is to be removed from the shaft, a screw driver or other tool engages the free end of the tube and forces the same toward the bearing 33 until the pulley can be axially removed without engaging the extension 46 of the tube.

A modified form of the last mentioned invention is illustrated in Fig. 6. In this form of the invention the shaft 113 mounts the pulley hub 141 and the chamber 139 therein is formed by a cup shaped flange construction 142, which is a press fitted arrangement, and is yieldingly retained therein. In this form of the invention the tubular portion 145 need not include an elongated flexible extension 146 but may include but a short portion terminating in a mouth similar to the mouth 47, because the cup shaped flange 142 will first be removed when the pulley is to be removed from the shaft and then the pulley can be pulled from the shaft without tearing off the tube 145. Tube 145 communicates with the passages 144 and 143 that in turn communicate with the lubricant chamber 136.

In the form of the invention illustrated in Fig. 7 the rotor is indicated by the numeral 215, the shaft by the numeral 213, the housing by the numeral 210. The lubricant chamber 236 in this instance, is formed by providing a pair of spaced bushings 212 and 235 which are mounted in a single bore that extends entirely through the casing. Mounted in the chamber 236 is the usual oil distributor or felt washer 237, and carried by the opposite exposed end of the shaft 213 is a pulley construction 241.

In this form of the invention no provision is made for returning the lubricant to the reservoir and the opening 238 may be provided with a pressure feeding mechanism for filling the sump with oil or grease or the same may be plugged. Likewise in this form of the invention the end of the main body or casing has an enlarged bore 270 which mounts a multiple sealing and excess end thrust construction.

The seal 220 is held tight to the running face by spring tension. When the pump is assembled this is from ten to twelve pounds and as long as the end thrust does not exceed this pressure, shaft 213 will not move forward toward the pulley end. If the pressure is exceeded the shaft moves and the upper press fitted spacing cup 292 engages excess thrust washer 293 which takes all the excess end thrust or the washer 293 runs against the retaining cup 294. Felt washer 295 is for oil retention.

The usual combination seal and thrust bearing is interposed between the rotor 215 and the face 219 of the body construction. This combination seal and thrust bearing may be of the character previously illustrated in Fig. 1.

In Fig. 8 a modified form of the invention is illustrated, wherein the stationary lugs 328 are formed upon the housing or body portion 310 having the bearing portion 311 which includes the bushing 312 rotatably supporting shaft 313. The rotor 315, in this instance, has a face 319 and engages the composition washer or thrust bearing 320 carried by the cylindrical cup member 326 and locked thereto as at 327 and the exposed flange 329. The cup 326 incloses the usual soft gasket packing 325, backed by the washer 324 and associated therewith is the resilient or yielding construction 320' of the character illustrated in Figs. 4 and 5.

The opposite end of the shaft extends through the chamber 336 and through the bore or bearing 334, said chamber being formed by two bushings 312 and 335. Access to the chamber may be obtained through the opening 338 with which also communicates a longitudinal passage 343 and a parallel passage 344, in which is mounted a flexible tube or universally yielding hinged tubular construction 345. The dotted lines indicate two of the positions the same may assume to permit removal and mounting of the pulley 341, having the belt engaging portion 340, the chamber forming portion 339 and the chamber forming flange 342. In this form of the invention the body also includes a co-operating exterior flange 324a. The usual lubricant seal 371 may be interposed between the end of the body bushing and pulley. The flange 342, it will be noted, overhangs the flange 342a so that oil dripping from the end will not run out and run down around the edge of the pulley. The clearance between the two flanges may be in the neighborhood of .003 of an inch or the like. The flexible tube construction 345 is such that it will always return to the oil collecting position when released from constraint.

A modified seal and thrust bearing construction is illustrated in Figs. 9 and 10. In this form of the invention the shaft bearing is indicated by the numeral 411, the shaft by the numeral 413, the bushing by the numeral 412 and the contact or thrust face by the numeral 419. The thrust bearing member is indicated by the numeral 431 and is supported by the driving cup 426 and lockingly retained therein by the flange 429 and the offset portion 432. The soft gasket is indicated by the numeral 425 and the washer backing the same by the numeral 424.

In this form of the invention the rotor 415 includes a plurality of slots 428 which receive the tongue portions 427 of the cup 426 for positive driving thereof. Bearing upon the main body portion of the rotor 415 and outside of the cup but concentric therewith, is a coil spring 420 which bears upon flange 432 of the cup at its opposite end so as to normally force the thrust bearing member 431 into engagement with the face 419.

The invention claimed is:—

1. In a device of the character described, a seal assembly for a revoluble shaft having an outer casing, a shaft bearing and a shoulder end bearing associated therewith, said seal assembly including a housing spaced from said shaft; a yieldable packing material disposed within said housing and adapted to contact with said shaft; a fluid sealing means located within said housing adapted to contact with said end bearing, said sealing means comprising a member of phenol condensation product adapted to form and maintain a fluid tight joint with said shoulder bearing; and a spring means for urging said seal against said shoulder bearing; and means whereby the end sealing means of said assembly is movably connected and driven through said housing from means associated with said shaft so as to provide a uniform contact between said sealing means and said shoulder bearing irrespective of slight variation in shaft position.

2. In a device of the character described, a seal assembly for a revoluble shaft having an outer casing, a shaft bearing therein and a shoulder end bearing, said seal assembly including a member forming a shell or seal housing spaced from said shaft; a pliable packing material surrounding said shaft located within said shell member, a fluid sealing means connected with said shell member and adapted to contact with said end bearing, said sealing means comprising a member of phenol condensation product adapted to form and maintain a fluid tight joint with said shoulder bearing; and a spring means for urging said sealing means against said shoulder bearing; said shell member having means for connecting and driving said assembly and end seal from said shaft so as to permit relatively free movement of said seal maintaining the sealing contact thereof with said bearing irrespective of variation in shaft alignment or wear.

3. In a device of the character described, a seal assembly for a revoluble shaft having an outer casing; a shaft bearing associated therewith and an end bearing, said seal assembly including a seal housing portion forming a space around said shaft; a yieldable packing material in close frictional sealing connection with said shaft and located within said space, said packing material adapted to rotate with the shaft; a fluid sealing means including a member of phenol condensation product in fluid sealing contact with said packing material, said member adapted to contact with said end bearing and adapted to form and maintain a fluid tight joint therewith; and a spring means for urging said seal against said end bearing; said housing having means for relatively loosely connecting and driving said fluid sealing member with said shaft so as to permit relatively free movement and cause said member to uniformly contact with said bearing.

In witness whereof, I have hereunto affixed my signature.

WILLIAM M. BAUMHECKEL.